United States Patent Office 3,810,905
Patented May 14, 1974

---

3,810,905
PYRAZOLO[3,4-b]PYRIDINE-5-CARBOXAMIDES
Hans Hoehn, Tegernheim, Germany, and Jack Bernstein, New Brunswick, N.J., assignors to E. R. Squibb & Sons, Inc., Princeton, N.J.
No Drawing. Continuation-in-part of application Ser. No. 195,808, Nov. 4, 1971, now Patent No. 3,733,328, dated May 15, 1973, which is a continuation-in-part of application Ser. No. 62,674, Aug. 10, 1970, now Patent No. 3,720,675, dated Mar. 13, 1973. This application Sept. 22, 1972, Ser. No. 291,504
Int. Cl. C07d 31/44
U.S. Cl. 260—295.5 B                      10 Claims

ABSTRACT OF THE DISCLOSURE

New 5-carboxamides of pyrazolo[3,4-b]pyridines and salts thereof are useful as ataractic, analgesic and anti-inflammatory agents.

CROSS REFERENCE TO RELATED APPLICATIONS

This application is a continuation-in-part of application Ser. No. 195,808, filed Nov. 4, 1971, now U.S. Pat. No. 3,733,328, which in turn is a continuation-in-part of application Ser. No. 62,674, filed Aug. 10, 1970, now U.S. Pat. No. 3,720,675.

SUMMARY OF THE INVENTION

This invention relates to new pyrazolo[3,4-b]pyridine-5-carboxamides and salts of these compounds. These new compounds have the formula (I)
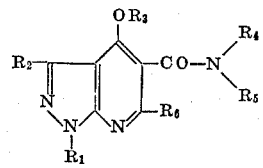

The symbols have the following meanings in Formula I and throughout this specification: $R_1$ represents hydrogen, lower alkyl, phenyl, phenyl-lower alkyl or cycloalkyl, $R_2$ represents hydrogen, lower alkyl or phenyl, $R_3$ represents lower alkyl. The nitrogen group

represents an acyclic amino group wherein $R_4$ and $R_5$ each is hydrogen, lower alkyl, hydroxy-lower alkyl or di-lower alkylamino-lower alkylene. This basic group may also form a monocyclic nitrogen heterocyclic of 5-, 6- or 7-members (exclusive of hydrogen) in which an additional nitrogen, oxygen or sulfur may be present and which also may bear one or two simple substituents, all totalling up to 18 atoms (exclusive of hydrogen). $R_6$ is hydrogen or lower alkyl.

Preferred within each of the substituent groups represented by the symbols are the following: $R_1$ is hydrogen or lower alkyl, especially ethyl; $R_2$ is hydrogen; $R_3$ is ethyl; $R_4$ is hydrogen or lower alkyl, especially butyl; $R_5$ is hydrogen or di-lower alkylamino-lower alkylene, especially diethylaminoethyl; or $R_4$ and $R_5$ together with the nitrogen to which they are attached form one of the heterocyclics, pyrrolidino, piperidino or piperazino. When $R_5$ is di-lower alkylamino-lower alkylene, $R_4$ is preferably hydrogen. $R_6$ is preferably hydrogen or methyl.

DETAILED DESCRIPTION OF THE INVENTION

The lower alkyl groups represented by $R_1$, $R_2$, $R_3$, $R_4$, $R_5$ and $R_6$ include straight or branched chain hydrocarbon groups of up to 7 carbon atoms like methyl, ethyl, propyl, isopropyl, butyl, t-butyl and the like, the first two being preferred except, as indicated above, in the case of $R_4$, butyl is preferred. The lower alkylene groups are hydrocarbon groups of the same kind. The lower alkoxy (referred to below) and hydroxy-lower alkyl groups similarly include such alkyl groups linked to an oxygen atom or hydroxy group, respectively, e.g., methoxy, propoxy, ethoxy, isopropoxy, hydroxymethyl, hydroxyethyl and the like. The cycloalkyl groups represented by $R_1$ are 3- to 6-carbon alicyclics including cyclopropyl, cyclobutyl, cyclopentyl or cyclohexyl, the last two being preferred.

In the basic nitrogen containing radical (II)

in Formula I, $R_4$ and $R_5$ each represents hydrogen, lower alkyl, hydroxy-lower alkyl or di-lower alkylamino-lower alkylene forming such basic groups as amino, lower alkylamino, e.g., methylamino, ethylamino, isopropylamino, di(lower alkyl)amino, e.g., dimethylamino, diethylamino, dipropylamino, (hydroxy-lower alkyl)amino, e.g., hydroxyethylamino, di(hydroxy-lower alkyl)amino, e.g., di(hydroxyethyl)amino, and di-lower alkylamino-lower alkyleneamino, e.g., dimethylaminomethylamino, diethylaminoethylamino, dimethylaminoethylamino, and the like.

In addition the nitrogen may join with the groups represented by $R_4$ and $R_5$ to form a 5- to 7-membered monocyclic heterocyclic containing, if desired, an oxygen, sulfur or an additional nitrogen atom (not more than two hetero atoms altogether), e.g., piperidino, pyrrolidino, morpholino, thiamorpholino, piperazino, hexamethyleneimino and homopiperazino radicals. These heterocyclic groups may also be substituted by one or two of the groups lower alkyl, lower alkoxy, hydroxy-lower alkyl or alkanoyl-lower alkyl. The lower alkyl, lower alkoxy and hydroxy-lower alkyl groups are the same as those already described; the alkanoyl moieties are the acyl radicals of lower fatty acids, including for example, acetyl, propionyl, butyryl and the like, as well as acyl radicals of higher fatty acids of up to 14 carbons.

Heterocyclic groups represented by the radical II include for example, piperidino, di(lower alkyl)piperidino, e.g., 2,3-dimethylpiperidino, 2-, 3- or 4-(lower alkoxy) piperidino, e.g., 2-methoxypiperidino, 2-, 3- or 4-(lower alkyl)piperidino, e.g., 2-, 3- or 4-methylpiperidino, pyrrolidino, (lower alkyl)pyrrolidino, e.g., 2-methylpyrrolidino, di(lower alkyl)pyrrolidino, e.g., 2,3-dimethylpyrrolidino, (lower alkoxy)pyrrolidino, e.g., 2-ethoxypyrrolidino, morpholino, (lower alkyl)morpholino, e.g., 3-methylmorpholino or 2-methylmorpholino, di(lower alkyl)morpholino, e.g., 2,3-dimethylmorpholino, (lower alkoxy)morpholino, e.g., 2-ethoxymorpholino, thiamorpholino, (lower alkyl)thiamorpholino, e.g., 3-methylthiamorpholino or 2-methylthiamorpholino, di(lower alkyl)thiamorpholino, e.g., 2,3-diethylthiamorpholino, 2,3-dimethylthiamorpholino, (lower alkoxy)thiamorpholino, e.g., 2-methoxythiamorpholino, piperazino, (lower alkyl)piperazino, e.g., 4-methylpiperazino, 2 - methylpiperazino, (hydroxy-lower alkyl)piperazino, e.g., 4 - (2 - hydroxyethyl)piperazino, di(lower alkyl)piperazino, e.g., 2,3-dimethylpiperazino, alkanoyloxy(lower alkyl)piperazino, e.g., $N^4$-(2-dodecanoyloxyethyl)piperazino, hexamethyleneimino and homopiperazino.

The new compounds of Formula I are produced from compounds of the formula (II) 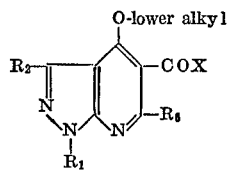

wherein X is chlorine or bromine.

The compounds of Formula II are produced from compounds of the formula (III) 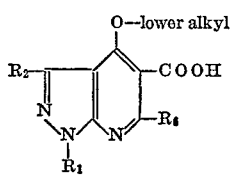

as described in copending application Ser. No. 833,673, filed June 16, 1969, i.e., producing a 5-amino-pyrazole of the formula (IV) 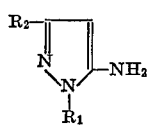

by ring closure of an aldehyde or ketone hydrazone of the formula (V) 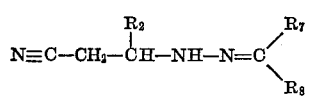

wherein $R_7$ and $R_8$ each is hydrogen, lower alkyl, phenyl or phenyl-lower alkyl. This is effected by heating at a temperature of about 90° to 130° C. in an inert liquid solvent like butanol in the presence of an alkali metal alcoholate catalyst like sodium butylate.

The 5-aminopyrazole of Formula IV is made to react with an alkoxymethylene malonic acid ester of the formula (VI) 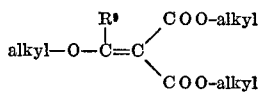

by heating at a temperature of about 120° C.

The resulting compound of the formula (VII) 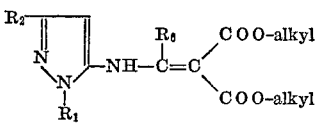

is cyclized in an inert organic solvent such as diphenyl ether at about 230 to 260° C. while distilling off the alcohol formed, producing a compound of Formula III with a hydroxy group in the 4-position and an acid ester group in the 5-position. This is then alkylated by treatment with an alkyl halide in an inert organic solvent like dimethylformamide in the presence of an alkali metal carbonate to obtain the ether which in turn is hydrolyzed with aqueous sodium hydroxide providing a compound of Formula III.

Alternatively, instead of alkylating, the 4-hydroxy compound may be refluxed for several hours with a phosphorous oxychloride to obtain a compound of Formula III with a chlorine in the 4-position and an acid ester group in the 5-position. Alkylation of this compound with a metal alcoholate like those mentioned above, then hydrolysis with aqueous sodium hydroxide, provides the compound of Formula III.

To obtain a product of Formula I wherein $R_1$ is hydrogen, the foregoing procedure is modified. By this modification, a 5-aminopyrazole of Formula IV wherein $R_1$ is an arylmethyl group or heteromethyl group is used. This starting material has the formula (IVa) 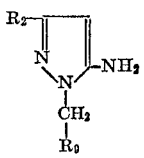

wherein $R_9$ is an aromatic or heterocyclic nucleus like phenyl, naphthyl, furyl (which is preferred), pyridyl, pyrimidyl, pyrazinyl or the like.

This material is processed as described above through the reaction with the alkoxymethylene malonic acid ester of Formula VI, cyclization of the product of Formula VII thus obtained to produce a compound of Formula III with a hydroxy group in the 4-position and a carboxylic acid ester moiety in the 5-position. Alkylating by treatment with an alkyl halide in an inert organic solvent like dimethylformamide in the presence of an alkali metal carbonate provides the carboxylic acid ester of Formula III.

At this point, the compound of the foregoing formula having in the 1-position the $—CH_2—R_9$ substituent, is oxidized with an oxidizing agent like selenium dioxide in a high boiling solvent like diethylene glycol dimethyl ether at about 160° C. This yields a compound of Formula III wherein $R_1$ is hydrogen and the carboxylic acid group is replaced by a carboxylic acid ester moiety.

The compound of Formula III is converted by means of thionyl chloride or phosphorous halides, such as the chloride, to the compound of Formula II.

The products of Formula I are then produced from compounds of Formula II by reaction with the appropriate amine of the formula (IX) 

This reaction is effected by treating the reactants either at room temperature or lower temperatures in a hydrocarbon solvent like benzene.

The compounds of Formula I form salts which are also part of this invention. The salts include acid-addition salts, particularly the non-toxic, physiologically acceptable members. The bases of Formula I form salts by reaction with a variety of inorganic and organic acids providing acid addition salts including, for example, hydrohalides (especially hydrochloride and hydrobromide), sulfate, nitrate, borate, phosphate, oxalate, tartrate, maleate, citrate, acetate, ascorbate, succinate, benzenesulfonate, methanesulfonate, cyclohexanesulfamate, toluenesulfonate and the like. The acid addition salts frequently provide a convenient means for isolating the product, e.g., by forming and precipitating the salt in a medium in which the salt is insoluble, then after separation of the salt, neutralizing with a base such as barium hydroxide or sodium hydroxide, to obtain the free base of Formula I. Other salts may then be formed from the free base by reaction with an equivalent of acid.

The new compounds of this invention are central nervous system depressants and may be used as tranquilizers or ataractic agents for the relief of anxiety and tension states, for example, in mice, cats, rats, dogs and other mammalian species, in the same manner as chlorodiazepoxide. For this purpose a compound or mixture of compounds of Formula I or non-toxic, physiologically acceptable acid addition salt thereof, may be administered orally or parenterally in a conventional dosage form such as tablet, capsule, injectable or the like. A single dose, or preferably 2 to 4 divided daily doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds of this invention also have anti-inflammatory and analgesic properties and are useful as anti-inflammatory agents, for example, to reduce local inflammatory conditions such as those of an edematous nature or resulting from proliferation of connective tissue in various mammalian species such as rats, dogs and the like when given orally in dosages of about 5 to 50 mg./kg./day, preferably 5 to 25 mg./kg./day, in single or 2 to 4 divided doses, as indicated by the carageenan edema assay in rats. The active substance may be utilized in compositions such as tablets, capsules, solutions or supenion containing up to about 300 mg. per unit of dosage of a compound or mixture of compounds of Formula I or physiologically acceptable acid addition salt thereof. They may be compounded in conventional manner with a physiologically acceptable vehicle or carrier, excipient, binder, preservative, stabilizer, flavor, etc. as called for by accepted pharmaceutical practice. Topical preparations containing about 0.01 to 3 percent by weight of active substance in a lotion, salve or cream may also be used.

The following examples are illustrative of the invention and constitute preferred embodiments. Other members of the class may be similarly produced by varying the starting materials with the appropriately substituted analogs. All temperatures are on the centigrade scale.

EXAMPLE 1

4-ethoxy-1-ethyl-1H-pyrazolo[3,4-b]pyridine-5-N-butylcarboxamide (a) [[(1 - ethyl - 5 - pyrazolyl)amino]methylene] malonic acid diethyl ester: 245 g. of 1-ethyl-5-aminopyrazole (2.2 mol) and 476 g. of ethoxymethylene malonic acid diethyl ester (2.2 mol) are heated to 120° (bath temperature) for 2 hours with stirring. The ethanol formed by this reaction is removed by means of a water aspirator. Then vacuum distillation (B.P.$_{0.1}$ 154–160°) yields 520 g. (84% of theory) of a quickly crystallizing oil of [[(1 - ethyl-5-pyrazolyl)amino]methylene]malonic acid diethyl ester, M.P. 50–53°.

(b) 1 - ethyl - 4 - hydroxy-1H-pyrazolo[3,4-b]pyridine-5-carboxylic acid ethyl ester: 253 g. of [[(1-ethyl-5-pyrazolyl)amino]methylene]malonic acid diethyl ester (0.9 mol) are dissolved in 770 g. of diphenyl ether. The reaction mixture is heated to 235–250° (bath temperature) and allowed to react at this temperature for 1 to 2 hours while the resulting ethanol is continuously distilled off. The last amount of alcohol is removed by means of a water aspirator. The diphenyl ether is separated by distillation with a fractionating column in vacuo. The 1-ethyl-4-hydroxy-1H-pyrazolo[3,4 - b]pyridine - 5 - carboxylic acid ethyl ester is obtained at B.P.$_{0.05}$ 115–120°, yield 195 g.=92% of theory, M.P. 85–87°.

(c) 4 - ethoxy - 1 - ethyl-1H-pyrazolo[3,4-b]pyridine-5-carboxylic acid: In a solution of 259 g. (1.1 mol) of 1-ethyl-4-hydroxy-1H-pyrazolo[3,4-b]pyridine - 5 - carboxylic acid ethyl ester in 1700 ml. of dimethylformamide, 400 g. of well pulverized potassium carbonate and 300 g. of ethyl iodide are introduced. The reaction mixture is stirred for 7 hours at 65° and filtered under suction, while hot, from excess potassium carbonate. Upon standing overnight, 165 g. of 4-ethoxy-1-ethyl-1H-pyrazolo[3,4-b] pyridine-5-carboxylic acid ethyl ester crystallize out of the solution, M.P. 112–115° After evaporation of the mother liquor, an additional 80 g. are obtained. The total yield amounts to 85% of theory.

Hydrolysis of this product with aqueous sodium hydroxide at room temperature and stirring yields after acidification 4-ethoxy-1-ethyl - 1H - pyrazolo[3,4 - b] pyridine-5-carboxylic acid, M.P. 198–199°, yield 92.5%.

(d) 4 - ethoxy - 1 - ethyl-1H-pyrazolo[3,4-b]pyridine-5-carboxylic acid chloride: 26.5 g. of 4-ethoxy-1-ethyl-1H-pyrazolo[3,4-b]pyridine-5-carboxylic acid (0.11 mol) and 150 ml. of thionyl chloride are refluxed for 7 hours. Subsequently, the thionyl chloride is removed by means of a water aspirator. The residue, weighing 27 g. (96% of theory), contains the crude 4-ethoxy-1-ethyl-1H-pyrazolo[3,4-b]pyridine-5-carboxylic acid chloride, M.P. 116–120°, which can be used, without further purification, for the next reaction step. A recrystallized sample melts at 122–124°.

(e) 4 - ethoxy - 1 - ethyl-1H-pyrazolo[3,4-b]pyridine-5-butylcarboxamide: To 7.5 g. of 4-ethoxy-1-ethyl-1H-pyrazolo[3,4-b]pyridine-5-carboxylic acid chloride (0.03 mol) suspended in 60 ml. of benzene are added slowly 4.4 g. of butylamine (0.06 mol). After a short time the starting material dissolves and the solution becomes temporarily clear. Upon standing at room temperature for 24 hours, a precipitate forms which consists of butylamine hydrochloride as well as 4-ethoxy-1-ethyl-1H-pyrazolo-[3,4-b]pyridine-5-N-butylcarboxamide. The precipitate is filtered under suction and washed with water in order to dissolve the butylamine hydrochloride. There remains 3 g. of carboxamide. An additional 5 g. is obtained by evaporation of the benzene reaction liquor. The total yield amounts to 8 g.=92% of theory, M.P. 119–121°. Recrystallization from cyclohexane-benzene provides 4-ethoxy - 1 - ethyl - 1H-pyrazolo[3,4-b]pyridine-5-N-butylcarboxamide, M.P. 122–124°.

EXAMPLE 2

4-ethoxy-1-ethyl-5-(1-pyrrolidinylcarbonyl)-1H-pyrazolo-[3,4-b]pyridine hydrochloride (a) 4-chloro - 1 - ethyl-1H-pyrazolo[3,4-b]pyridine-5-carboxylic acid ethyl ester: A mixture of 23.5 g. of 1-ethyl-4-hydroxy - 1H - pyrazolo[3,4-b]pyridine-4-carboxylic acid ethyl ester (0.1 mol) and 150 ml. of phosphorous oxychloride is refluxed for 4 hours. Subsequently the excess phosphorous oxychloride is removed by means of vacuum distillation. As soon as the phosphorous oxychloride has been removed, the oily residue solidifies on cooling. It is treated with water and filtered under suction (24.5 g.), M.P. 55–60°. The 4-chloro-1-ethyl-1H-pyrazolo[3,4-b]pyridine-4-carboxylic acid ethyl ester is recrystallized from n-hexane (22.5 g.=87%), M.P. 62°.

(b) 4-ethoxy - 1 - ethyl-1H-pyrazolo[3,4-b]pyridine-5-carboxylic acid ethyl ester: To a solution of 2.3 g. of sodium (0.1 mol) in 250 ml. of ethanol there is added 25.4 g. of 4-chloro-1-ethyl-1H-pyrazolo[3,4-b]pyridine-5-carboxylic acid ethyl ester (0.1 mol). This mixture is kept at room temperature for 12 hours. After this time, the separated sodium chloride is filtered under suction and the filtrate is evaporated in vacuo to dryness. The residue, 4-ethoxy-1-ethyl-1H-pyrazolo[3,4-b]pyridine-5-carboxylic acid ethyl ester, is recrystallized from benzene (90–100°), M.P. 113–115°, yield 24.8 g.=94.5% of theory.

(c) 4-ethoxy - 1 - ethyl-1H-pyrazolo[3,4-b]pyridine-5-carboxylic acid: 26.3 g. of 4-ethoxy-1-ethyl-1H-pyrazolo[3,4-b]pyridine-5-carboxylic acid ester (0.1 mol) is hydrolyzed with 375 ml. of aqueous sodium hydroxide (1.5 N) at room temperature with stirring for 10 hours. After acidification with hydrogen chloride, there are obtained 21.8 g. of 4-ethoxy-1-ethyl-1H-pyrazolo[3,4-b]pyridine-5-carboxylic acid, M.P. 198–199°, yield 92.5%.

(d) 4-ethoxy - 1 - ethyl-1H-pyrazolo[3,4-b]pyridine-5-carboxylic acid chloride: The 4-ethoxy-1-ethoxy-1-ethyl-1H-pyrazolo[3,4-b]pyridine-5-carboxylic acid is converted to the acid chloride according to the procedure of Example 1(d).

(e) 4 - ethoxy - 1 - ethyl - 5 - (1 - pyrrolidinylcarbonyl - 1H - pyrazole[3,4-b]pyridine hydrochloride: 2.9 g. of pyrrolidine (0.04 mol) are slowly added to a suspension consisting of 5 g. of 4 - ethoxy - 1 - ethyl - 1H - pyrazolo[3,4-b]pyridine - 4 - carboxylic acid chloride in 50 ml. of benzene. After dissolving the reaction components, the solution is kept two days at room temperature. Then the precipitated hydrochloride is filtered under suction and the remaining filtrate is evaporated in vacuo. The oily residue is dissolved in ether, the ethereal solution is allowed to stand overnight and the by-product which precipitates (0.7 g.) is removed. Then the ethereal solution is evaporated. The resulting oily residue (9.2 g.=80% of theory) becomes crystalline. The 4 - ethoxy-1-ethyl-5-(1-pyrrolidinylcarbonyl)-1H-pyrazolo[3,4-b]pyridine is recrystallized from cyclohexane, M.P. 85–87°.

The hydrochloride salt is formed by treating the above product with ethanolic hydrogen chloride solution, M.P. 140–142° (dec.).

The following compounds are prepared by the procedure of Example 1 by substituting the appropriate amine in part (e) for the butylamine.

EXAMPLE 14

5-butylaminocarbonyl-4-ethoxy-1H-pyrazolo[3,4-b]pyridine (a) [[[1 - (4 - picolyl) - 5 - pyrazolyl]amino]methylene]malonic acid diethyl ester: 174 g. of 1-(4-picolyl)-5-aminopyrazole and 216 g. of ethoxymethylene malonic acid diethyl ester are heated with stirring at 140°, until the theoretical amount of alcohol has distilled off. The reaction mixture crystallizes on cooling. Recrystallization from ethyl acetate yields 220 g. of [[[1-(4-picolyl)-5-pyrazolyl]amino]methylene]malonic acid diethyl ester (65%), M.P. 95–97°.

(b) 4 - hydroxy - 1 - (4 - picolyl)-1H-pyrazolo[3,4-b]pyridine-5-carboxylic acid ethyl ester: 86 g. of [[[1-(4-picolyl)-5-pyrazolyl]amino]methylene]malonic acid diethyl ester (0.25 mol.) are heated at 240° for 15 minutes. The dark oil is cooled and 200 ml. of methanol are added. 4-hydroxy - 1 - (4-picolyl)-1H-pyrazolo[3,4-b]pyridine-5-

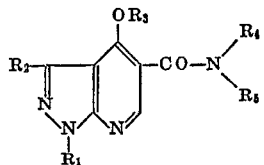

| Example | $R_1$ | $R_2$ | $R_3$ | $-N\begin{matrix}R_4\\R_5\end{matrix}$ | Salt | Recrystallization medium | M.P., degrees |
|---|---|---|---|---|---|---|---|
| 3 | $CH_3-CH_2$ | H | $CH_3-CH_2$ | $-NH_2$ | | Benzene | 184–185 |
| 4 | $CH_3-CH_2$ | H | $CH_3-CH_2$ | $-N\!\!<\!\!S\!\!>$ | | Cyclohexane | 123–124 |
| 5 | $CH_3-CH_2$ | H | $CH_3-CH_2$ | $-N\!\!<\!\!S\!\!>\!\!N-CH_3$ | 2HCl | Alcohol/ethyl acetate | [1] 202–205 |
| 6 | $CH_3-CH_2$ | H | $CH_3-CH_2$ | $-N\!\!<\!\!S\!\!>\!\!N-CH_2-CH_2-OH$ | | Ethylacetate | 106–108 |
| 7 | $CH_3-CH_2$ | H | $CH_3-CH_2$ | $-NH-(CH_2)_2-N(C_2H_5)_2$ | { ; HCl } | Cyclohexane; Ethylacetate/abs. alcohol | 109–111; [1] 135–137 |

[1] Decomposition.

The following compounds are prepared by the procedure of Example 2 by substituting the appropriately substituted 4-hydroxy - 1H - pyrazolo[3,4-b]pyridine-5-carboxylic acid ethyl ester in part (a) and the appropriate amine in part (e):

carboxylic acid ethyl ester crystallizes on standing, yield 33 g. (44%), M.P. 140°.

(c) 4-hydroxy - 1H - pyrazolo[3,4-b]pyridine - 5 - carboxylic acid ethyl ester: 3 g. of 4-hydroxy-1-(4-picolyl)-1H-pyrazolo[3,4-b]pyridine-5-carboxylic acid ethyl ester

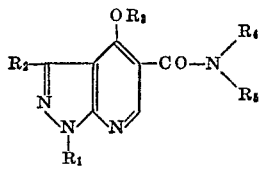

| Example | $R_1$ | $R_2$ | $R_3$ | $-N\begin{matrix}R_4\\R_5\end{matrix}$ |
|---|---|---|---|---|
| 8 | $\bigcirc\!\!-$ | H | $CH_3-CH_2$ | $-N(C_2H_5)_2$ |
| 9 | $\bigcirc\!\!-CH_3$ | $CH_3$ | $CH_3$ | $-NHCH_3$ |
| 10 | $\bigcirc\!\!_S$ | $CH_3-CH_2$ | $CH_3-CH_2$ | $-N(CH_3)_2$ |
| 11 | $CH_3-CH_2$ | H | $CH_3-CH_2$ | $-N(CH_2CH_2OH)_2$ |
| 12 | $CH_3-CH_2$ | $\bigcirc\!\!-$ | $CH_3-CH_2$ | $-NHC_2H_5$ |
| 13 | $CH_3$ | H | $CH_3$ | $-NHCH_2N(CH_3)_2$ |

(0.01 mol.) are dissolved in 20 ml. of acetic acid. 2.2 g. of selenium dioxide (0.02 mol.) and 2-3 drops of water are added. The mixture is refluxed for 30 minutes and then filtered off. 4-hydroxy-1H-pyrazolo[3,4-b]pyridine-5-carboxylic acid ethyl ester precipitates on cooling. Recrystallization from acetic acid yields 1.8 g. (87%), M.P. 275°.

(d) 4 - ethoxy - 1H - pyrazolo[3,4-b]pyridine - 5 - carboxylic acid ethyl ester: 4.1 g. of 4-hydroxy-1H-pyrazolo[3,4-b]pyridine-5-carboxylic acid ethyl ester (0.02 mol.), 5.6 g. of potassium carbonate (0.04 mol.) and 3.5 g. of ethyl iodide (0.022 mol.) are heated in 30 ml. of dimethylformamide with stirring for 10 hours at 60°. After this time, the excess potassium carbonate is filtered off and 30 ml. of water are added. 4-ethoxy-1H-pyrazolo[3,4-b]pyridine-5-carboxylic acid ethyl ester precipitates and is recrystallized from methanol, yield 2 g. (42.5%), M.P. 180°.

(e) 4 - ethoxy - 1H - pyrazolo[3,4-b]pyridine - 5 - carboxylic acid: 5.7 g. of 4-ethoxy-1H-pyrazolo[3,4-b]pyridine-5-carboxylic acid ethyl ester (0.02 mol.) are treated with a solution of 2.3 g. of potassium hydroxide in 20 ml. of alcohol for 12 hours at 50°. The solvent is distilled off, the residue is dissolved in 20 ml. of water and acidified with some acetic acid. 4-ethoxy-1H-pyrazolo[3,4-b]pyridine-5-carboxylic acid solidifies and is recrystallized from acetic acid, yield 3.1 g. (76%), M.P. 268-270°.

(f) 5 - butylaminocarbonyl - 4 - ethoxy - 1H - pyrazolo[3,4-b]pyridine: 2.1 g. of 4-ethoxy-1H-pyrazolo[3,4-b]pyridine-5-carboxylic acid (0.01 mol.) is refluxed with 10 ml. of thionyl chloride for 5 hours. After this time, the excess thionyl chloride is removed in vacuo and to the residue are added 20 ml. of anhydrous benzene. Then 1.5 g. of n-butylamine are dropped slowly into the reaction mixture, which is stirred for 12 additional hours at room temperature. Subsequently, the solvent is distilled off and the residue crystallizes upon adding water. Recrystallization yields 1.8 g. (68%) of 5-butylaminocarbonyl-4-ethoxy-1H-pyrazolo[3,4-b]pyridine, M.P. 211°.

The following compounds are prepared by the procedure of Example 14 by substituting the appropriately substituted 4-hydroxy-1H-pyrazolo[3,4-b]pyridine-5-carboxylic acid ethyl ester in part (c) and the appropriate amine in part (f):

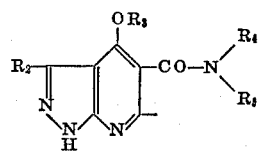

| Example | R₂ | R₃ | N(R₄)(R₅) |
|---|---|---|---|
| 15 | H | CH₃—CH₂— | —N(C₂H₅)₂ |
| 16 | CH₃ | CH₃— | —NH—CH(CH₃)₂ |
| 17 | C₆H₅ (phenyl) | CH₃—CH₂— | —NH—(CH₂)₃CH₃ |
| 18 | H | CH₃—CH₂—CH₂—CH₂— | —NH—CH₃ |
| 19 | CH₃ | (CH₃)₂CH—CH₂—CH₂— | —NH—CH₂—CH₃ |
| 20 | CH₃ | CH₃—(CH₂)₆— | —N(C₂H₅)₂ |
| 21 | C₆H₅ (phenyl) | CH₃—CH₂— | —NH—CH₂—CH₂—N(CH₃)₂ |
| 22 | H | CH₃— | —NH—(CH₂)₃CH₃ |
| 23 | H | CH₃—CH₂— | thiomorpholino |
| 24 | H | (CH₃)₂CH— | thiomorpholino |
| 25 | CH₃ | CH₃— | thiomorpholino-N—H |
| 26 | H | CH₃—CH₂— | thiomorpholino-N—CH₃ |
| 27 | H | CH₃—CH₂—CH₂— | thiomorpholino-N—CH₂—CH₂—OH |

The following compounds are prepared by the procedure of the example indicated, by substituting the substituted 4-hydroxy-1H-pyrazolo[3,4-b]pyridine-5-carboxylic acid ethyl ester having the same substituents indicated below in part (e) and the amine having the $R_4$ and $R_5$ substituents indicated below in part (f):

3. A compound according to claim 1 wherein $R_4$ is di-lower alkylamino-lower alkylene and $R_5$ is hydrogen.

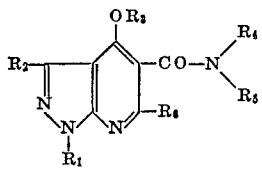

| Example | Procedure of example | $R_1$ | $R_2$ | $R_3$ | $N{<}^{R_4}_{R_5}$ | $R_6$ |
|---|---|---|---|---|---|---|
| 28 | 1 | ⌬-CH₂ | H | CH₃—CH₂— | —N(C₂H₅)₂ | CH₃ |
| 29 | 1 | ⟨S⟩ | CH₃ | CH₃— | —NH—CH(CH₃)₂ | C₂H₅ |
| 30 | 1 | ⟨S⟩- | ⌬ | CH₃—CH₂— | —NH—(CH₂)₂CH₃ | CH₃ |
| 31 | 14 | H | H | CH₃—CH₂—CH₂—CH₂— | —NH—CH₃ | C₂H₅ |
| 32 | 1 | ⌬ | CH₃ | (CH₃)₂CH—CH₂—CH₂— | —NH—CH₂—CH₃ | CH₃ |
| 33 | 14 | H | CH₃ | CH₃—(CH₂)₅— | —N(C₂H₅)₂ | CH₃ |
| 34 | 1 | C₂H₅ | ⌬ | CH₃—CH₂— | —NH—CH₂—CH₂—N(CH₃)₂ | C₂H₅ |
| 35 | 14 | H | H | CH₃— | —NH—(CH₂)₅CH₃ | CH₃ |
| 36 | 1 | ⌬ | H | CH₃—CH₂— | —N⟨S⟩ | CH₃ |
| 37 | 1 | H | H | (CH₃)₂CH— | —N⟨S⟩ | CH₃ |

What is claimed is:
1. A compound of the formula

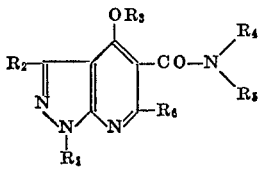

wherein $R_1$ is hydrogen, lower alkyl, phenyl, phenyl-lower alkyl or cycloalkyl of 3 to 6 carbons, $R_2$ is hydrogen, lower alkyl or phenyl, $R_3$ is lower alkyl, $R_4$ and $R_5$ each is hydrogen, lower alkyl, ω-hydroxy-lower alkyl or di-lower alkyl-amino-lower alkylene or $R_4$ and $R_5$ together with the nitrogen are pyrrolidino, and $R_6$ is hydrogen methyl or ethyl; said lower alkyl and lower alkylene groups having 1 to 4 carbons, and physiologically acceptable acid addition salts thereof.

2. A compound of the formula

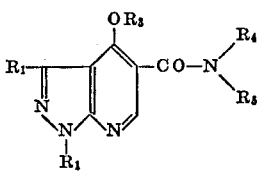

wherein $R_1$ is hydrogen, lower alkyl, phenyl, phenyl-lower alkyl or cycloalkyl of 3 to 6 carbons, $R_2$ is hydrogen, lower alkyl or phenyl, $R_3$ is lower alkyl, $R_4$ and $R_5$ each is hydrogen, lower alkyl, ω-hydroxy-lower alkyl or di-lower alkylamino-lower alkylene, said lower alkyl and lower alkylene groups having 1 to 4 carbons, and physiologically acceptable acid addition salts thereof.

4. A compound according to claim 1 wherein $R_1$ and $R_3$ each is ethyl and $R_2$ is hydrogen.

5. A compound according to claim 1 wherein $R_4$ is hydrogen and $R_5$ is lower alkylamino.

6. A compound according to claim 5 wherein the lower alkylamino group is butylamino, $R_1$ and $R_3$ each is ethyl and $R_2$ and $R_6$ each is hydrogen.

7. A compound according to claim 1 wherein

is pyrrolidino.

8. A compound according to claim 7 wherein $R_1$ and $R_3$ each is lower alkyl and $R_2$ and $R_6$ each is hydrogen.

9. A compound according to claim 8 wherein each lower alkyl group is ethyl.

10. The hydrochloride of the compound of claim 9.

References Cited
UNITED STATES PATENTS

| | | | |
|---|---|---|---|
| 3,250,769 | 5/1966 | Schmidt | 260—268 BC |
| 3,373,163 | 1/1969 | Blatter | 260—268 BC |
| 3,542,793 | 11/1970 | Rossi | 260—295.5 B |
| 3,629,271 | 12/1971 | Hoehn | 260—295.5 B |

OTHER REFERENCES
Roberts et al., Basic Principles of Organic Chemistry, Benjamin Publishers, p. 806 (1965).

ALAN L. ROTMAN, Primary Examiner

U.S. Cl. X.R.

260—243 B, 247.5 B, 250 A, 268 BC, 293.6, 294.8 C, 296 H, 465 E, 465 R, 310 R; 424—246, 248, 250, 266, 267